United States Patent [19]

Baubles

[11] Patent Number: 4,735,535
[45] Date of Patent: Apr. 5, 1988

[54] LOCKNUT HAVING A SINGLE-TURN THREAD

[75] Inventor: Richard C. Baubles, Maplewood, N.J.

[73] Assignee: Jacobson Mfg. Co., Inc., Kenilworth, N.J.

[21] Appl. No.: 710,407

[22] Filed: Mar. 11, 1985

[51] Int. Cl.$^4$ .......................................... F16B 39/282
[52] U.S. Cl. .................................. 411/188; 411/189; 411/436; 411/959
[58] Field of Search ............... 411/184, 185, 186, 187, 411/427, 436, 437, 527, 188, 189, 959; 285/161

[56] References Cited

U.S. PATENT DOCUMENTS

| | | |
|---|---|---|
| 1,749,600 | 3/1930 | Olson . |
| 1,813,947 | 7/1931 | Olson . |
| 1,878,827 | 9/1932 | Connell . |
| 2,044,444 | 6/1936 | Pond . |
| 2,226,491 | 12/1940 | Gustafson .......................... 411/186 |
| 2,284,081 | 5/1942 | Beggs ............................ 411/959 X |
| 2,396,588 | 3/1946 | Luce ............................. 411/959 X |
| 2,687,757 | 8/1954 | Appleton . |
| 2,770,668 | 11/1956 | Appleton ............................ 285/161 |
| 2,824,480 | 2/1958 | Hotchkin ........................... 411/437 |
| 3,108,371 | 10/1963 | Munse . |
| 3,164,055 | 1/1965 | Duffy ............................ 411/527 X |
| 3,207,532 | 9/1965 | Sebo .............................. 285/161 X |
| 3,260,293 | 7/1966 | Gohs . |
| 3,343,580 | 9/1967 | Coldren ............................ 411/186 |
| 3,397,726 | 8/1968 | Gohs . |
| 3,583,274 | 6/1971 | Duffy ............................. 411/436 |
| 3,608,601 | 9/1971 | Gohs . |
| 4,079,475 | 3/1978 | Thompson .......................... 10/86 R |
| 4,188,178 | 2/1980 | Anscher ........................... 249/59 X |

FOREIGN PATENT DOCUMENTS

| | | | |
|---|---|---|---|
| 590397 | 1/1960 | Canada ............................ 411/427 |
| 2325296 | 4/1977 | France ............................ 411/427 |
| 153561 | 6/1932 | Switzerland ....................... 411/427 |
| 185488 | 10/1936 | Switzerland ....................... 411/427 |
| 784722 | 10/1957 | United Kingdom ................. 411/427 |
| 1434852 | 5/1976 | United Kingdom ................. 411/437 |
| 2067701 | 7/1981 | United Kingdom ................. 411/427 |

*Primary Examiner*—Lloyd A. Gall
*Attorney, Agent, or Firm*—Richard L. Cannaday; Frank J. DeRosa

[57] ABSTRACT

A locknut having a single-turn thread for securing electrical fittings, threaded conduit and the like to electrical junction boxes and the like is disclosed. The locknut comprises a generally cylindrical portion, a flange portion attached to the cylindrical portion, a plurality of teeth attached to and projecting radially outwardly of the flange portion and axially beyond the end of the flange portion, and a standard thread attached to and extending for substantially only a single turn interiorly of the cylindrical portion. The thread has an included angle corresponding to that of a standard thread, for example, 60°. The teeth seat against a work surface when the locknut is threaded onto the fitting and act as springs which can compensate for a small degree of element loosening by spring recovery. In addition, the thread of the locknut is flexible so that both the teeth and thread act as springs working in conjunction with each other.

10 Claims, 2 Drawing Sheets

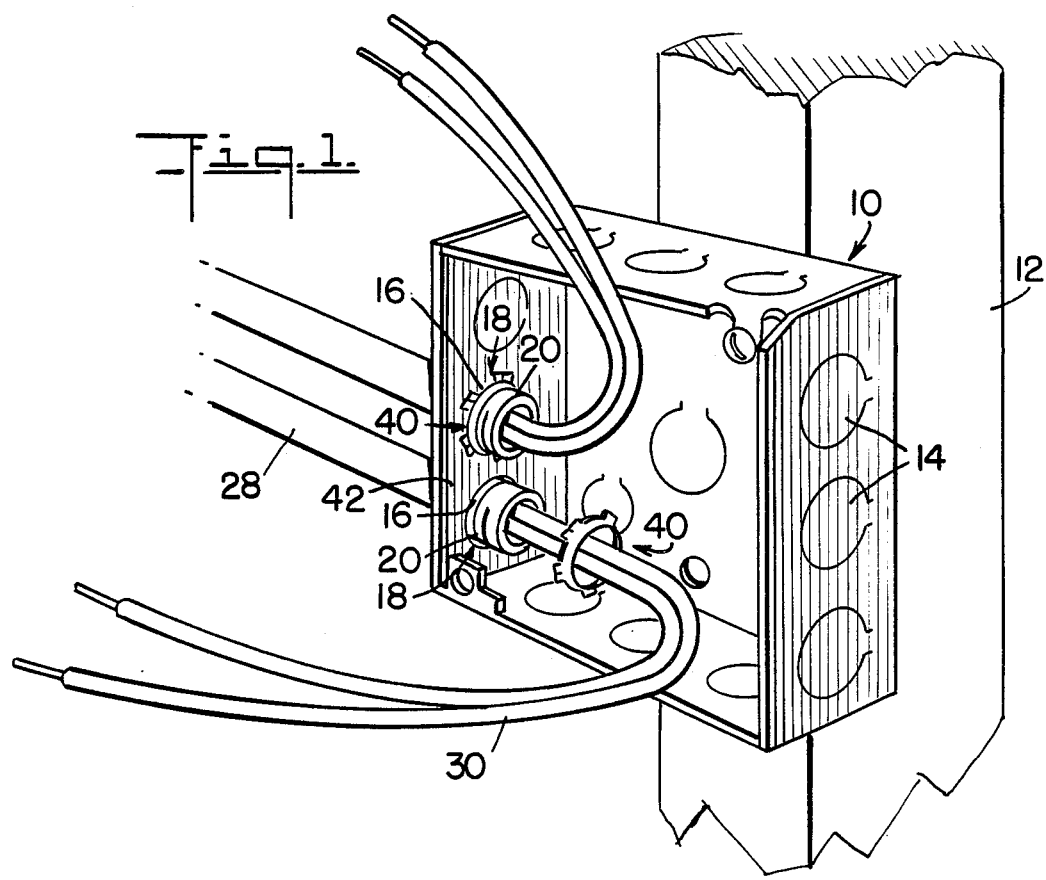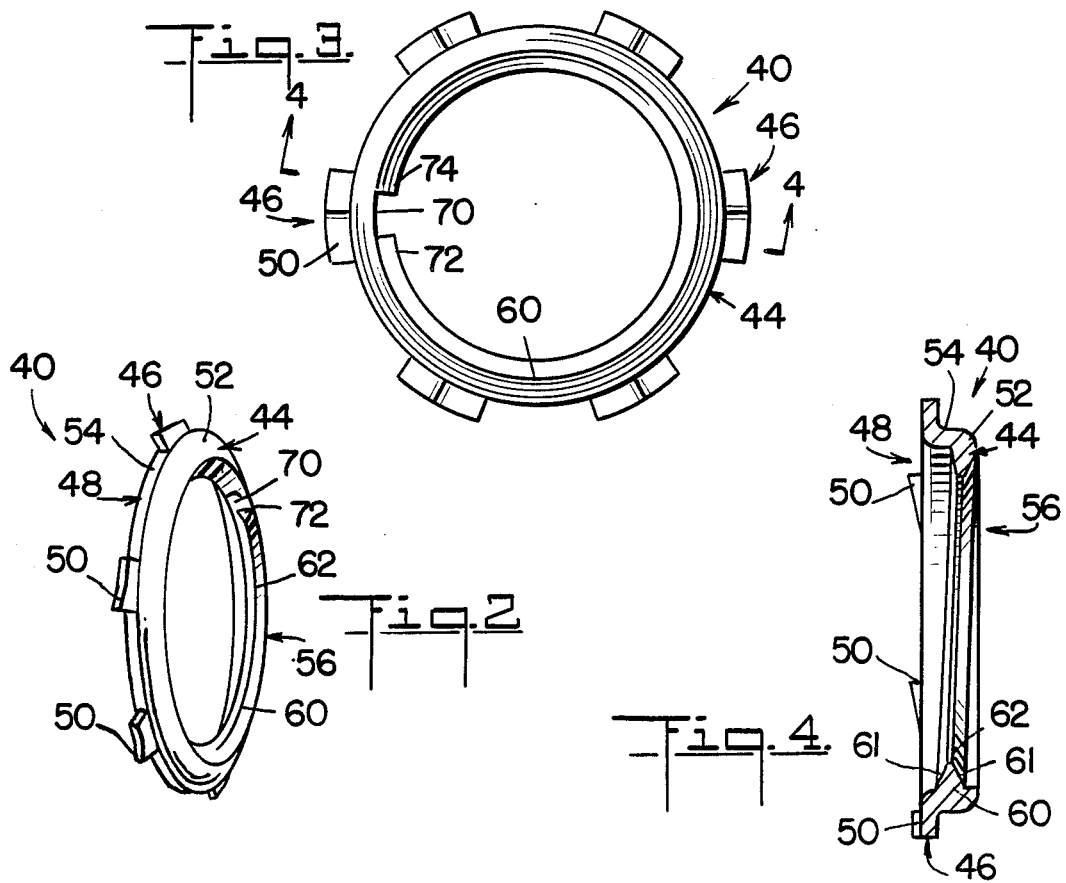

LOCKNUT HAVING A SINGLE-TURN THREAD

BACKGROUND OF THE INVENTION

The present invention relates to a locknut for securing a threaded fitting and the like to a workpiece, or to a housing, particularly for electrical or electronic connections and/or equipment.

One known type of locknut used for connecting threaded fittings and threaded conduits to housings such as electrical junction boxes comprises a generally cylindrical portion having a multiple-turn thread helically extending interiorly of the cylindrical portion and spaced teeth or ears having portions projecting axially and radially outwardly of the cylindrical portion. The teeth are configured so that their radially extending portions can be impacted by the tip of a screwdriver or like implement when the locknut is threaded to the fitting or conduit to tighten the locknut against a housing. The teeth are further configured and of such hardness that their axially projecting portions may cut into the surface of the housing as the locknut is tightened against the housing to help provide good electrical contact between the locknut and the housing. The teeth can exhibit a limited degree of flexing in the axial direction as the locknut is tightened against the housing, which can provide a spring action capable of compensating by spring recovery for a slight loosening of the locknut.

Another known type of locknut is similar to the one described above in that it includes a cylindrical portion having a multiple-turn thread and radially extending ears. The ears are configured so that they can be impacted by the tip of a screwdriver or like element for tightening the locknut against a housing. However, the ears do no project axially beyond the end of the locknut. Instead, teeth in the form of a multiplicity of small ridges are disposed on an end face of the locknut projecting axially therefrom.

Still another known type of locknut is made of relatively thin sheet material and has a single-turn thread formed by bending the thin sheet material surrounding the central opening of the locknut. In order to mold the thin sheet material into a thread helix, the periphery of the central opening is slit at at least one place and bent one way and the other way either side of the slit to form the helix. Although such locknuts can be used with fittings having standard threads as defined hereinafter because the thread helices of the locknut and fitting may be matched approximately, locking characteristics are not particularly good because the parallel flanks of the locknut thread make contact with the converging flanks of the standard thread only along lines, as opposed to surfaces when both the locknut thread and the fitting thread are standard.

As used herein, "standard thread" refers to one in which the flanks of the thread converge towards the crest of the thread and form an included angle therebetween of from about 29° to about 60°.

OBJECTS AND SUMMARY OF THE INVENTION

It is an object of the present invention to provide an improved locknut having a standard thread.

It is another object of the present invention to provide a locknut having standard thread which has improved locking characteristics when used with a member having a standard thread.

Briefly, the present invention achieves the above and other objects and provides a locknut having a substantially singleturn, standard thread. The locknut comprises an annular body, a plurality of teeth circumferentially spaced about the body adjacent a first end of the body, and the substantially single-turn, standard thread which is attached to and extends interiorly of the body.

The standard thread of the locknut has flanks which converge in the direction of the thread crest and form an included angle of from about 29° to about 60°. The locknut thread profile or form may be a complete or full form or an incomplete form. Thus, the flanks of the standard thread of the locknut may intersect in a crest apex or they may form a crest truncation and, similarly, the flanks may intersect with the locknut body in a root apex or may form a root truncation. Also, the surfaces of the flanks may be planar or curved.

As a result, the flanks of the standard, substantially single-turn thread of the locknut provide surfaces of contact with mating flanks of a standard threaded member, as opposed to simply lines of contact provided by the prior single-turn sheet metal locknuts.

According to a feature of the invention, the locknut includes structure which flexes when the locknut is tightened against a workpiece. Such structure, according to an embodiment of the invention, comprises a flexible portion of the teeth and/or a flexible single-turn thread.

According to an embodiment of the invention, the annular body of the locknut includes a generally cylindrical portion and a flange portion attached thereto. The flange portion lies for the most part in a plane which is substantially normal to the axis of the cylindrical portion. The flange portion has a free end defining the first end of the locknut and the cylindrical portion has a free end defining a second end of the locknut. The teeth are attached to the flange portion and project radially outwardly from the locknut as well as axially beyond the first end. The teeth may include a portion inclined axially relative to the body which portion projects axially beyond the first end of the locknut, and that inclined portion may be flexible in the axial direction so that it flexes when the locknut is tightened against a workpiece.

The thread is defined by a first end which may be substantially coplanar with the free end of the cylindrical portion, a helically-extending portion and a second end disposed adjacent the flange portion. A gap which separates the first and second thread ends facilitates flexing of the single-turn thread, and can improve the locking characteristics of the locknut.

In use, the locknut teeth seat against a work surface and may cut into it slightly as the locknut is tightened to assist in providing an electrical ground path contact between the locknut and the work surface. The teeth may exhibit a limited amount of flexing during tightening and thereby act as springs, compensating by spring recovery for a small degree of element loosening. The single-turn thread itself may, in addition to or in lieu of flexing of the teeth, exhibit a limited amount of flexing during tightening and act as a spring in the locknut system.

When both the single-turn thread and the teeth exhibit flexibility, their combined action quite surprisingly and unexpectedly enhances performance of the locknut as both the teeth and the thread act as springs working in conjunction with each other. Because the thread is attached to the locknut body for only one turn, there is not the bracing action that occurs in prior locknuts with multiple-turn threads. The locking action that is provided by the inventive locknut having teeth and a single-turn thread which flex in use is surprisingly significantly increased over the locking action of prior art locknuts.

The above and other objects aspects, features and advantages of the present invention may be more readily perceived from the following description of the perferred embodiment thereof taken with the accompanying drawings and appended claims.

BRIEF DESCRIPTION OF THE DRAWINGS

The present invention is illustrated by way of example and not limitation in the Figures of the accompanying drawings in which like reference numbers indicate like parts and in which:

FIG. 1 is a perspective view of an electrical junction box to which electrical fittings are secured by locknuts according to the present invention;

FIG. 2 is a side perspective view of a locknut according to the present invention depicted in FIG. 1;

FIG. 3 is a top plan view of the locknut depicted in FIG. 2;

FIG. 4 is a diametrical section view of the locknut depicted in FIG. 3 taken along line 4—4 therein;

DESCRIPTION OF THE PREFERRED EMBODIMENTS

Figure 5:
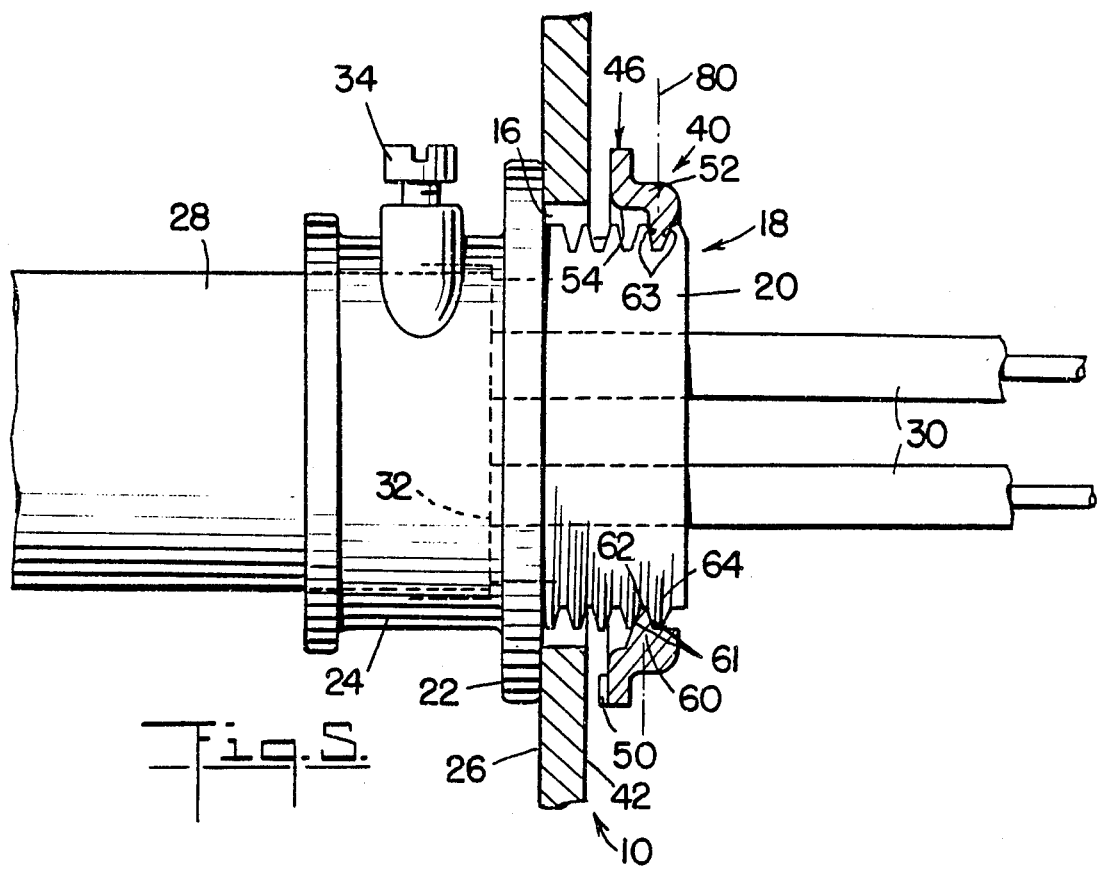
FIG. 5 is an enlarged view, partially in section, of the electrical fitting, the locknut according to the present invention and a portion of the electrical junction box depicted in FIG. 1, illustrating the locknut threaded to the electrical fitting in a loosened condition of the locknut.

Although the locknut according to the invention is illustrated and described in connection with securing an electrical fitting to an electrical junction box typically used in AC power distribution systems, its employment is not so limited. A locknut according to the present invention can be used to connect electrical fittings, electrical connectors and threaded members to workpieces other than junction boxes, for example, to housings and workpieces for electrical, electronic and other equipment, and to secure fittings, electrical connectors and threaded members other than those used in AC power distribution systems.

Referring to FIG. 1, an electrical junction box 10 is depicted secured to a wooden stud 12. The junction box 10 includes partially severed circular portions 14 which can be removed to provide openings 16 for receiving electrical fittings 18. Electrical fittings 18 (see FIG. 5) are of the type which includes a male or externally threaded portion 20, a flange portion 22 and a hollow cylindrical receptacle portion 24. The flange portion 22 is disposed to bear against the outer surface 26 of the junction box surrounding an opening 16 with the threaded portion 20 protruding into the junction box. The receptacle portion 24 is adapted to receive tubing 28 through which extend electrical wires 30. The interior of the receptacle portion 24 includes shoulder 32 which forms a stop for the tubing 28. The fitting also includes a screw 34 threaded through the fitting to engage the tubing 28 to secure the tubing to the fitting.

The tubing 28, fitting 20, wires 30 and junction box 10 are all conventional.

A locknut 40 according to the invention is threaded on to the threaded portion 20 of the fitting 18 and tightened against the interior surface 42 of the junction box to secure the fitting 18 to the junction box.

Referring next to FIGS. 2-4, the locknut 40 comprises an annular body 44 and a plurality of teeth 46 attached to and circumferentially spaced about the body 44 adjacent a first end 48 thereof. The teeth 46 project radially outwardly of the body 44 and extend circumferentially about it, and each includes a portion 50 inclined relative to the axial direction of the annular body and projecting beyond the first end 48 thereof. Upon tightening the locknut on a threaded member against a work surface, the teeth inclined portions 50 flex axially as described more fully below.

The annular body 44 includes a generally cylindrical portion 52 and a flange portion 54 attached thereto. The cylindrical portion 52 has an outer free end 56 (the second end of the locknut), and the flange portion has an outer free end 48 (the first end of the locknut). The teeth 46 are attached to and project radially outwardly from the flange portion 54, and the teeth portions are inclined tangentially relative to flange portion 54 and project axially beyond the free end 48 of flange portion 54. Teeth 46 have a circumferential extent which is less than the spacing between teeth.

Helically extending about the interior periphery of the cylindrical portion 52 is a single-turn thread 60. The thread 60 extends from the free end 56 of the cylindrical portion 52 substantially to flange portion 54. Thread 60 has flanks 61 which form an included angle of approximately 60° and converge in the direction of the thread crest 62. As shown, the form of thread 60 is generally triangular but not full, with the flanks 61 forming a truncation at the crest 62. Thus, thread 60 is a standard thread and makes contact with the flanks 63 of the standard male thread 64 (see FIG. 5) of the fitting 18 over substantially the full surface of the flanks 61, 63, and as a result can support relatively high thread loads without damage to the female thread 60 of the locknut or the male thread 64 of the fitting 18. In distinction, the parallel flank, square cross-section thread of a sheet metal locknut of the prior art makes contact with a standard fitting male thread only along a line.

A gap 70 (see FIGS. 2 and 3) extends through the thread 60 along the interior periphery of the cylindrical portion 52 and separates ends 72,74 of the thread 60. Thread end 72 is coplanar with the free end 56 of the cylindrical portion 52 and thread end 74 is adjacent the flange portion 54 at about the transition of the locknut from its cylindrical portion to its flange portion.

Figure 6:
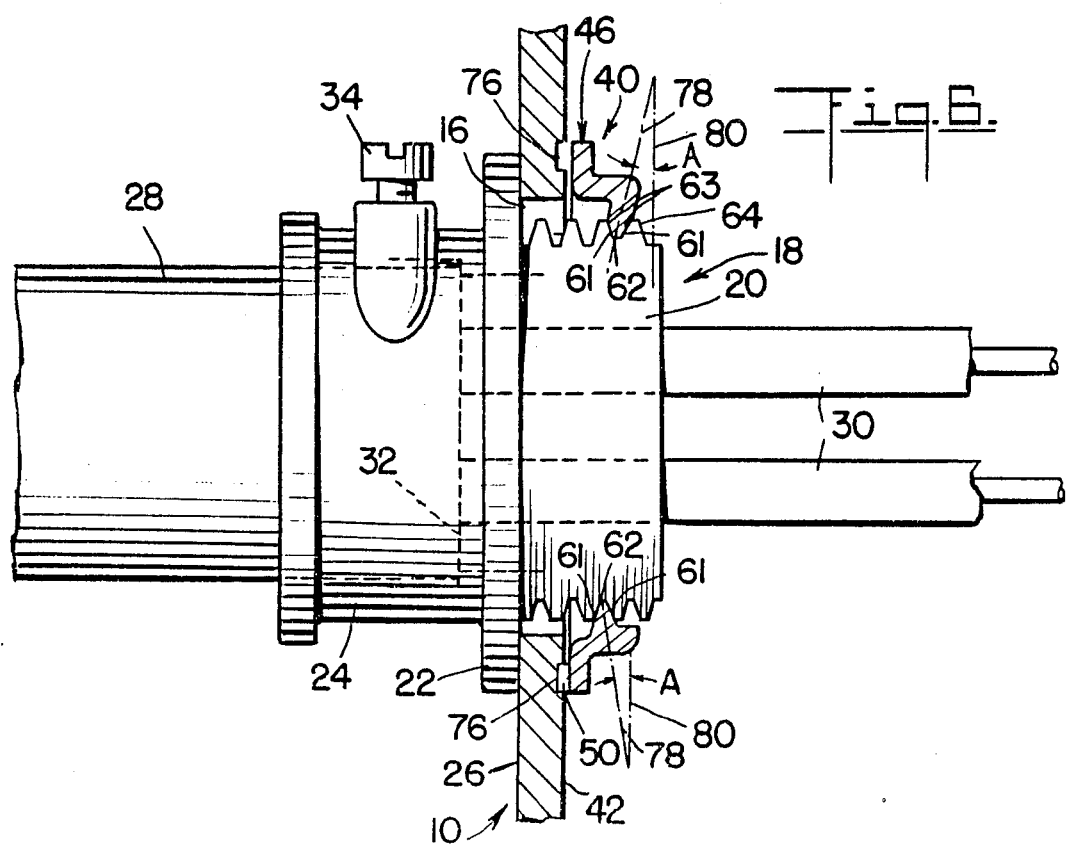
FIG. 6 is a view similar to that of FIG. 5 illustrating the locknut in a tightened condition.

In use, the locknut 40 is threaded onto the threaded portion 22 of the fitting as depicted in FIG. 5. Before tightening, the locknut thread 60 lies in a plane 80 designated by broken lines in FIG. 5, which is angled corresponding to the pitch of the thread on the fitting 20. The locknut 40 is then tightened against the junction box 10. That can be done conventionally by using the end of a screwdriver or a like implement to apply rotative force to the locknut teeth 46. Tightening is continued until the inclined portions 50 of the teeth 46 come into contact with the interior surface 42 of the junction box 10 and cut a shallow annular grroove 76 into the junction box surface as the locknut 40 rotates with its teeth 46 in contact with the junction box surface 42. Alternatively, the locknut 40 can be held against rotation and the fitting 18 rotated to pull the locknut teeth 46 into contact with surface 42 of the junction box. In that case, the teeth 46 will not cut a groove in the junction box surface 42 for lack of relative rotation between the locknut and the junction box but rather may indent surface 42. Typically, the teeth are made of a material harder than that of the surface against which the locknut is tightened. With the teeth inclined portions 50 in contact with the interior surface 42 of the junction box the locknut is tightened further, and the teeth 46 flex axially against the junction box surface as depicted in FIG. 6. The inclined portions 50 of the teeth 46 may flex up to about 20°, with part of the flexure being plastic and part elastic. At the same time, the seating load transferred by the teeth 46 to the single-turn thread 60 causes a limited elastic flexing of the thread 60 toward the interior surface 42 of the junction box as depicted in FIG. 6. In the tightened condition of the locknut depicted in FIG. 6, the thread 60 is elastically flexed so that the axis 78 of the thread 60 forms an angle "A" of up to about 5° with the plane 80. Such thread flexure is possible in the inventive locknut because the thread 60 is attached to the cylindrical portion 52 for only one turn, and the bracing action provided by prior art locknuts having multiple-turn threads does not occur. For a locknut of about one inch diameter made from about 0.06 inch thick steel, thread flexure can amount to several thousandths of an inch.

Because the teeth 46 flex they act a spring, and can compensate for a small degree of element loosening by spring recovery. In addition, the flexible single-turn thread 60 acts as a spring which can also compensate for a small degree of element loosening. However, the combine spring action of the teeth 46 and thread 60 working in conjunction with each other significantly increases the amount of spring back and resulting locking action provided by the locknut 40 according to the invention.

The locknut of this invention may be used for securing fittings other than the illustrated fitting 18 to a workpiece. The inventive locknut may also be used for securing a straight, unflanged threaded member to a workpiece by placing a first locknut, which may but need not be an inventive locknut, backwards on the threaded member to act as a flange on and against one side of the workpiece, and using an inventive locknut on the other side of the workpiece in the manner described and illustrated herein.

Protection by Letters Patent of this invention in all its aspects as the same are set forth in the appended claims is sought to the full extent that the prior art allows.

I claim as my invention:

1. A locknut comprising an annular body including a generally cylindrical portion and a flange portion attached thereto, said flange portion having a free end defining a first end of said locknut and said cylindrical portion having a free end defining a second end of said locknut, a plurality of teeth circumferentially spaced about said body and attached to said flange portion along their entire circumferential extent, said teeth having a circumferential extent with is less than the spacing between teeth, each of said teeth including a portion inclined tangentially relative to said flange portion which projects axially beyond said first end, said inclined portions of said teeth flexing with respect to said flange portion during normal tightening of said locknut on a threaded member to a work surface against which said inclined portions bear, and a standard thread attached to and extending for essentially only a single turn interiorly of said body.

2. The locknut according to claim 1 wherein substantially all of said thread is attached to said cylindrical portion.

3. The locknut according to claim 2 wherein said thread is defined by a first end substantially coplanar with said free end of said cylindrical portion, a helically extending portion and a second end disposed adjacent said flange portion.

4. The locknut according to claim 1 wherein said standard thread has an included angle of about 60°.

5. The locknut according to claim 1 wherein said thread is continuous for substantially the single turn thereof.

6. A locknut comprising an annular body including a generally cylindrical portion and a flange portion attached thereto, said flange portion having a free end defining a first end of said locknut and said cylindrical portion having a free end defining a second end of said locknut, a plurality of teeth attached to and circumferentially spaced about said flange portion adjacent said first end of said locknut, said teeth having a circumferential extent which is less than the spacing between teeth, said teeth being attached along their entire circumferential extent to said flange portion, and each of said teeth including a portion inclined tangentially relative to said flange portion which projects axially beyond said first end of said locknut, said inclined portions of said teeth flexing with respect to said flange portion in the axial direction of said locknut during normal tightening of said locknut on a threaded member to a work surface against which said inclined portions of said teeth bear, and a standard thread attached to and extending for essentially only a single turn interiorly of said body, said thread flexing in the axial direction of said locknut during normal tightening of said locknut on the threaded member when said inclined portions of said teeth bear against the work surface, whereby said teeth and said thread act as springs and may compensate by spring recovery for a small degree of loosening of said locknut after tightening.

7. The locknut according to claim 6 wherein substantially all of said thread is attached to said cylindrical portion.

8. The locknut according to claim 6 wherein said thread is defined by a first end substantially coplanar with said free end of said cylindrical portion, a helically extending portion and a second end disposed adjacent said flange portion.

9. The locknut according to claim 6 wherein said standard thread has an included angle of about 60°.

10. The locknut according to claim 6 wherein said thread is continuous for substantially the single turn thereof.

* * * * *

UNITED STATES PATENT AND TRADEMARK OFFICE
CERTIFICATE OF CORRECTION

PATENT NO. : 4,735,535
DATED : April 5, 1988
INVENTOR(S) : Richard C. Baubles

Page 1 of 2

It is certified that error appears in the above-identified patent and that said Letters Patent is hereby corrected as shown below:

Col. 1, line 37: "no" should read --not--.

Col. 1, line 68: between "having" and "standard" insert --a--.

Col. 2, line 5: "singleturn" should read --single-turn--.

Col. 2, line 24: between "prior" and "single-turn" insert --art--.

Col. 3, line 12: "perferred" should read --preferred--.

Col. 3, line 28: "4——4" should read --4 - 4--.

Col. 4, line 24: Between "portions" and "are" insert --50--.

UNITED STATES PATENT AND TRADEMARK OFFICE
CERTIFICATE OF CORRECTION

PATENT NO. : 4,735,535
DATED : April 5, 1988
INVENTOR(S) : Richard C. Baubles

It is certified that error appears in the above-identified patent and that said Letters Patent is hereby corrected as shown below:

Col. 4, line 65: "grrove" should read --groove--.

Col. 5, line 29: "a spring" should read --as springs--.

Col. 5, line 61 (Claim 1, line 9): "with" should read --which--.

Signed and Sealed this

Thirteenth Day of September, 1988

Attest:

DONALD J. QUIGG

*Attesting Officer*   *Commissioner of Patents and Trademarks*